US012413923B2

(12) United States Patent
Yamada et al.

(10) Patent No.: US 12,413,923 B2
(45) Date of Patent: Sep. 9, 2025

(54) ACOUSTIC FEATURE ESTIMATION METHOD, ACOUSTIC FEATURE ESTIMATION SYSTEM, RECORDING MEDIUM, AND RENDERING METHOD

(71) Applicant: Panasonic Intellectual Property Corporation of America, Torrance, CA (US)

(72) Inventors: Mariko Yamada, Hyogo (JP); Tomokazu Ishikawa, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 0 days.

(21) Appl. No.: 18/376,559

(22) Filed: Oct. 4, 2023

(65) Prior Publication Data

US 2024/0031756 A1 Jan. 25, 2024

Related U.S. Application Data

(63) Continuation of application No. PCT/JP2022/013521, filed on Mar. 23, 2022.

(60) Provisional application No. 63/173,658, filed on Apr. 12, 2021.

(30) Foreign Application Priority Data

Dec. 21, 2021 (JP) ................................ 2021-207300

(51) Int. Cl.

*H04R 5/00* (2006.01)
*H04S 7/00* (2006.01)
*H04R 3/00* (2006.01)

(52) U.S. Cl.

CPC .................................... *H04S 7/00* (2013.01)

(58) Field of Classification Search

CPC ........................................................ H04S 7/00
USPC .................................................... 381/26, 122
See application file for complete search history.

(56) References Cited

FOREIGN PATENT DOCUMENTS

| | | | |
|---|---|---|---|
| JP | 2012-242597 | 12/2012 | |
| WO | 2020/139588 | 7/2020 | |
| WO | WO-2020139588 A1 * | 7/2020 | .............. G01H 7/00 |

OTHER PUBLICATIONS

International Search Report issued Jun. 21, 2022 in International (PCT) Application No. PCT/JP2022/013521.
Extended European Search Report issued Aug. 6, 2024 in European Patent Application No. 22787961.6.

* cited by examiner

*Primary Examiner* — Ammar T Hamid
(74) *Attorney, Agent, or Firm* — Wenderoth, Lind & Ponack, L.L.P.

(57) ABSTRACT

An acoustic feature estimation method is an acoustic feature estimation method for estimating an acoustic feature of a space and includes acquiring data on the space, estimating situations in the space in accordance with the acquired data, correcting a provisional value of the acoustic feature in accordance with the estimated circumstances, and outputting the corrected provisional value.

20 Claims, 7 Drawing Sheets

FIG. 3

| No. | Name | Size (L × W × H) | Reverberation time | Material |
|---|---|---|---|---|
| 1 | Conference room | 4 × 6 × 2.8 | 300 ms | Reinforced plaster panel |
| 2 | Living room | 5 × 5 × 2.4 | 280 ms | Wood plaster panel |
| 3 | Hall | 10 × 12 × 5 | 450 ms | Reinforced concrete |
| ••• | ••• | ••• | ••• | ••• |

ACOUSTIC FEATURE ESTIMATION METHOD, ACOUSTIC FEATURE ESTIMATION SYSTEM, RECORDING MEDIUM, AND RENDERING METHOD

CROSS REFERENCE TO RELATED APPLICATIONS

This is a continuation application of PCT International Application No. PCT/JP2022/013521 filed on Mar. 23, 2022, designating the United States of America, which is based on and claims priority of U.S. Provisional Patent Application No. 63/173,658 filed on Apr. 12, 2021, and Japanese Patent Application No. 2021-207300 filed on Dec. 21, 2021. The entire disclosures of the above-identified applications, including the specifications, drawings and claims are incorporated herein by reference in their entirety.

FIELD

The present disclosure relates to an acoustic feature estimation method, an acoustic feature estimation system, a recording medium, and a rendering method.

BACKGROUND

Patent Literature (PTL) 1 discloses a technique for acquiring acoustic features (acoustic characteristics) of an indoor space by using equipment such as a measuring microphone array or a measuring speaker array.

CITATION LIST

Patent Literature

PTL 1: Japanese Unexamined Patent Application Publication No. 2012-242597

SUMMARY

Technical Problem

In recent years, consideration is being given to outputting sounds appropriate to an indoor space where a user who wears an augmented reality (AR) device is located, from the AR device to the user. To realize this, it is necessary to acquire acoustic features of the indoor space, but it is difficult with the technique disclosed in PTL 1, which requires dedicated equipment, to easily acquire acoustic features.

In view of this, the present disclosure provides an acoustic feature estimation method, an acoustic feature estimation system, a recording medium, and a rendering method that allow easy acquisition of acoustic features of a target indoor space.

Solution to Problem

An acoustic feature estimation method according to one embodiment of the present disclosure is an acoustic feature estimation method for estimating an acoustic feature of a space. The acoustic feature estimation method includes acquiring data on the space, estimating a situation in the space in accordance with the data acquired, correcting a provisional value of the acoustic feature in accordance with the situation estimated, and outputting the provisional value corrected.

An acoustic feature estimation system according to one embodiment of the present disclosure is an acoustic feature estimation system for estimating an acoustic feature of a space. The acoustic feature estimation system includes a acquirer that acquires data on the space, an information estimator that estimates a situation in the space in accordance with the data acquired, an acoustic feature estimator that corrects a provisional value of the acoustic feature in accordance with the situation estimated, and an output device that outputs the provisional value corrected.

A recording medium according to one embodiment of the present disclosure is a non-transitory computer-readable recording medium having recorded thereon a program for causing a computer to execute the acoustic feature estimation method described above A rendering method according to one embodiment of the present disclosure is a rendering method for rendering sound source data by using an acoustic feature. The acoustic feature is a value obtained by acquiring data on the space, estimating a situation in the space in accordance with the data acquired, and correcting a provisional value of the acoustic feature in accordance with the situation estimated.

Advantageous Effects

According to one embodiment of the present disclosure, it is possible to achieve an acoustic feature estimation method and so on that allow easy acquisition of acoustic features of a target indoor space.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 3 shows one example of a reference table that includes provisional values of acoustic features according to the embodiment.

DESCRIPTION OF EMBODIMENTS

Circumstances Leading to the Present Disclosure

Figure 1:
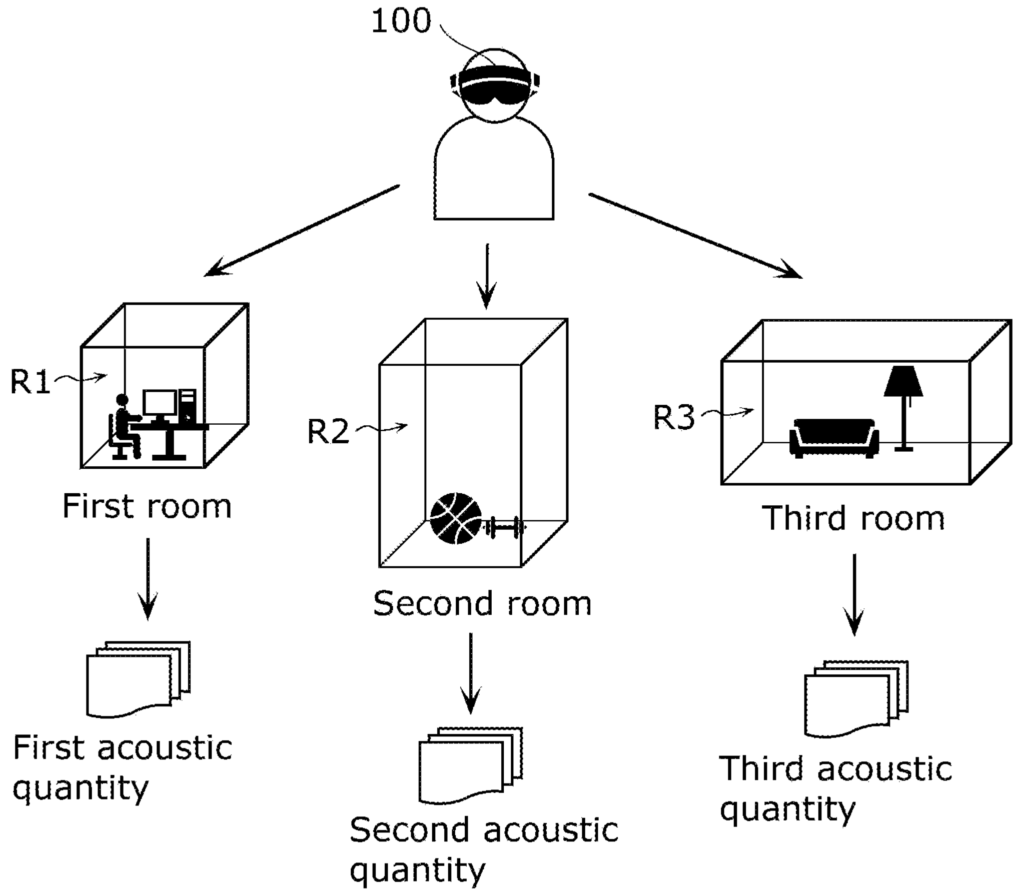
FIG. 1 is a diagram for describing challenges to acquisition of acoustic features.

Prior to describing the present disclosure, circumstances leading to the present disclosure will be described with reference to FIG. 1. FIG. 1 is a diagram for describing challenges to acquisition of acoustic features. In the specification of the present disclosure, the acoustic features refer to information that is necessary to render sound signals (sound data) in an indoor space such as a room, and refer to information for making a correction appropriate to the indoor space to the sound signals (correcting the sound signals).

The acoustic features include at least a reverberation time. The reverberation time refers to the length of time from a sound stop to attenuation of a predetermined sound pressure (e.g., 60 dB) and may be calculated by, for example, the Sabine formula. The acoustic features may further include at least either of reflectivity and sound absorptivity. The reflectivity refers to the ratio of the magnitude of reflected sound pressure to the magnitude of incident sound pressure on an object. The sound absorptivity refers to the ratio of non-reflected sound energy to incident sound energy.

The indoor space as used herein refers to a space that is blocked to some extent, and examples of the indoor space include a living room, a hall, a conference room, a corridor, stairs, and a bedroom. A target indoor space may be an indoor space where a user who wears AR device 100 is located, or may be an indoor space to be used by a user.

AR device 100 is a device that realizes augmented reality (AR) and may, for example, be a spectacle AR wearable terminal (so-called smart glasses) or AR head mounted display that is wearable by a user. Alternatively, AR device 100 may also be a mobile terminal such as a smartphone or a data assistant tablet. Note that augmented reality refers to technology for adding extra information to real environments such as scenery, geographic features, and objects in a real space by means of information processors.

AR device 100 may include, for example, a display, a camera, a speaker, a microphone, a processor, and memory. AR device 100 may include sensors such as a depth sensor or a global positioning system (GPS) sensor. The depth sensor may, for example, be a sensor that detects a distance between a predetermined position and an object included in an image captured by the camera. The depth sensor may, for example, be an infrared sensor. While the predetermined position is the current position of a user who wears AR device 100, the predetermined position is not limited thereto and may, for example, be a reference position that is preset in the indoor space.

The user is able to move between rooms, each having different acoustic features, while wearing AR device 100. In the example shown in FIG. 1, the user is able to move between a first room (indoor space R1), a second room (indoor space R2), and a third room (indoor space R3), each having a different room size and including a different number and types of objects. In this case, in order to allow AR device 100 to output sounds appropriate to the indoor space of each room, it is necessary to acquire features of the real space of each of the first to third rooms in advance. The features of the real space as used herein include a room size, an arrangement of objects, and acoustic features. In the example shown in FIG. 1, the acoustic features include first acoustic features that correspond to indoor space R1 of the first room, second acoustic features that correspond to indoor space R2 of the second room, and third acoustic features that correspond to indoor space R3 of the third room. The acoustic features refer to information that indicates, for example, the degree of reflection, i.e., how sounds are reflected, in the room.

The acoustic features vary because reflection characteristics of sounds from floors, walls, and objects vary depending on factors such as the room size, the number of objects in the room, materials for the objects, the building construction, and construction materials. For example, the first acoustic features, the second acoustic features, and the third acoustic features may be different from one another.

Although it is possible to acquire the acoustic features of each of indoor spaces R1, R2, and R3 by using, for example, the technique disclosed in PTL 1, time and effort will become necessary because dedicated equipment needs to be installed in each of the first to third rooms. Since the user is able to freely move between rooms while wearing AR device 100, it is not realistic to acquire the acoustic features from such dedicated equipment that is installed in, for example, each room.

In view of this, the inventors of the present application have eagerly studied an acoustic feature estimation method and so on that allow easy acquisition of acoustic features of a target indoor space, and have originated the idea of the acoustic feature estimation method and so on described hereinafter.

An acoustic feature estimation method according to one embodiment of the present disclosure is an acoustic feature estimation method for estimating an acoustic feature of an indoor space that is a target space. The acoustic feature estimation method includes acquiring indoor environment information that indicates an environment in the indoor space, determining a provisional value of the acoustic feature in accordance with the indoor environment information acquired, acquiring data on the indoor space, estimating a situation in the indoor space in accordance with the data acquired, correcting the provisional value in accordance with the situation estimated, and outputting the provisional value corrected, as the acoustic feature of the indoor space.

According to the acoustic feature estimation method of the present disclosure, the acoustic features of an indoor space are estimated by acquiring provisional values of the acoustic features and correcting the acquired provisional values in accordance with situations in the indoor space. That is, it is possible with the acoustic feature estimation method according to the present disclosure to acquire the acoustic features without using dedicated equipment for acquiring acoustic features. Accordingly, the acoustic feature estimation method according to the present disclosure allows easy acquisition of the acoustic features of a target indoor space.

For example, at least one of a first size of the indoor space or information about an object located in the indoor space may be estimated as the situation in accordance with the data, and in the correcting of the provisional value, the provisional value may be corrected in accordance with the at least one estimated.

In this way, the provisional values can be corrected based on objects and the size of the indoor space. That is, it is possible with the acoustic feature estimation method according to the present disclosure to acquire more accurate acoustic features without using dedicated equipment for acquiring acoustic features. Accordingly, the acoustic feature estimation method according to the present disclosure allows easy acquisition of more accurate acoustic features of a target indoor space. Note that more accurate acoustic features mean that the acoustic features are closer to actual acoustic features of the indoor space.

For example, the acoustic feature may include a reverberation time in the indoor space, and in the correcting of the provisional value, the provisional value of the reverberation time may be corrected in accordance with the first size.

Accordingly, it is possible to automatically correct the provisional value of the reverberation time in accordance with the size of the indoor space.

For example, whether or not to correct the provisional value of the reverberation time may be determined in accordance with the first size and a second size of a reference indoor space that corresponds to the environment, and in the correcting of the provisional value, the provisional value of the reverberation time may be corrected when it is determined that the provisional value of the reverberation time is to be corrected.

Since the acoustic features are estimated in accordance with the size of the indoor space only when necessary, it is possible to reduce throughput required to estimate the acoustic features.

For example, when the first size is larger than the second size, the provisional value of the reverberation time may be corrected to extend the reverberation time, and when the first size is smaller than the second size, the provisional value of the reverberation time may be corrected to shorten the reverberation time.

Accordingly, it is possible to easily acquire more accurate acoustic features in accordance with the size of the indoor space.

For example, the acoustic feature may include a reverberation time in the indoor space, and in the correcting of the provisional value, the provisional value of the reverberation time may be corrected in accordance with the information about the object.

Accordingly, it is possible to automatically correct the provisional value of the reverberation time in accordance with the information about the object.

For example, when it is determined that the provisional value of the reverberation time is to be corrected, at least one of a material or a shape of the object located in the indoor space may be estimated in accordance with the data, and in the correcting of the provisional value, the provisional value of the reverberation time may be corrected in accordance with the at least one of the material or the shape of the object estimated.

Accordingly, it is possible to acquire more accurate acoustic features appropriate to at least one of the material or shape of the object.

For example, in the acquiring of the indoor environment information, the indoor environment information may be acquired by estimating the indoor environment information in accordance with the data.

In this way, since the indoor environment can also be automatically acquired in accordance with the data, it is possible to more easily acquire the acoustic features.

For example, the acoustic feature of the indoor space may be used for rendering of a sound signal in an augmented reality (AR) device, and the data and the indoor environment information may be acquired from the AR device.

Accordingly, the user who wears the AR device is able to automatically acquire the acoustic features of the indoor space of the room by simply entering the room, without preparing any other device such as an image capturing device.

For example, the environment may include information indicating an intended use of the indoor space.

Accordingly, it is possible to estimate the provisional values of the acoustic features of the indoor space by simply acquiring the information indicating the intended use of the indoor space.

An acoustic feature estimation system according to one embodiment of the present disclosure is an acoustic feature estimation system for estimating an acoustic feature of an indoor space concerned. The acoustic feature estimation system includes a first acquirer that acquires indoor environment information that indicates an environment in the indoor space, a provisional value determiner that determines a provisional value of an acoustic feature of the indoor space in accordance with the indoor environment information acquired, a second acquirer that acquires data on the indoor space, an indoor information estimator that estimates a situation in the indoor space in accordance with the data acquired, an acoustic feature estimator that corrects the provisional value in accordance with the situation estimated, and an output device that outputs the provisional value corrected, as the acoustic feature of the indoor space. Moreover, a recording medium according to one embodiment of the present disclosure is a non-transitory computer-readable recording medium having recorded thereon a program for causing a computer to execute the acoustic feature estimation method described above.

Accordingly, it is possible to achieve similar effects to those of the acoustic feature estimation method described above.

It is to be noted that such generic or specific embodiments of the present disclosure may be implemented via a system, a method, an integrated circuit, a computer program, or a non-transitory recording medium such as a computer-readable CD-ROM, or may be implemented via any combination of them. The program may be stored in advance in a recording medium, or may be supplied to a recording medium via a wide-area communication network including the Internet.

Hereinafter, an embodiment will be described with reference to the drawings.

Note that the embodiment described below illustrates one generic or specific example. Numerical values, shapes, constituent elements, positions and connection forms of constituent elements, steps, sequences of steps, and so on in the following embodiment are merely one example, and do not intend to limit the scope of the present disclosure. Among the constituent elements described in the following embodiment, those that are not recited in any independent claim are described as arbitrary constituent elements.

Note that each figure is a schematic diagram and is not always illustrated in precise dimensions. Therefore, for example, scale reduction and the like in the drawings are not necessarily the same. Substantially the same configurations are given the same reference signs throughout the drawings, and detailed descriptions thereof shall be omitted or simplified.

In the specification of the present disclosure, numerical values and the ranges of numerical values are not always the expressions that represent only precise meaning, but are also the expressions that mean the inclusion of substantially equivalent ranges such as differences within ranges of several percent (e.g., about 10%).

Embodiment

Hereinafter, a sound data generation system that includes an acoustic feature estimation system according to an embodiment of the present disclosure will be described with reference to FIGS. 2 to 7.

[1. Configuration of Sound Data Generation System]

Figure 2:
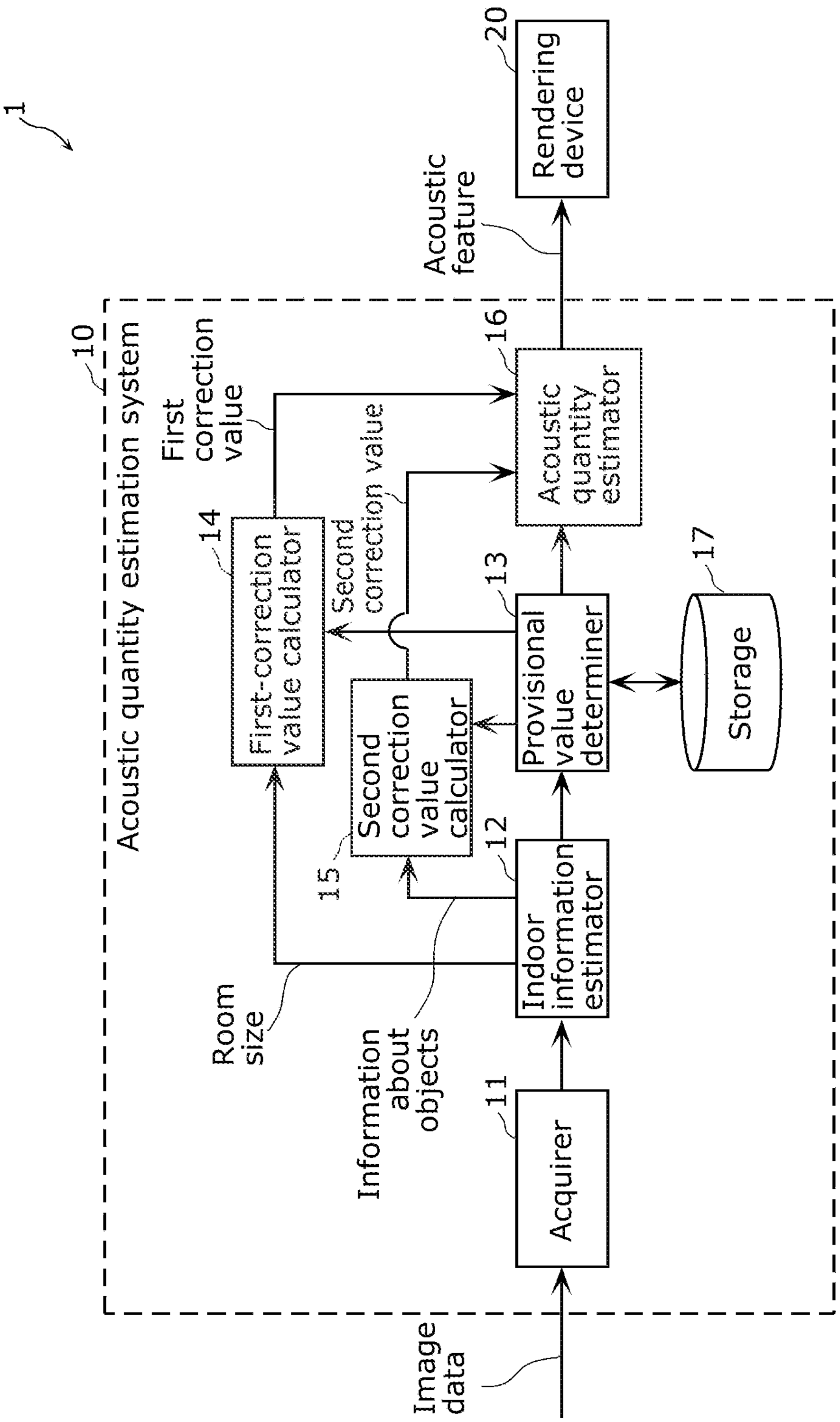
FIG. 2 is a block diagram showing a functional configuration of a sound data generation system according to an embodiment.

First, a configuration of the sound data generation system according to the present embodiment will be described with reference to FIG. 2. FIG. 2 is a block diagram showing a functional configuration of sound data generation system 1 according to the present embodiment. Sound data generation system 1 is an information processing system for generating sound data so that sounds appropriate to an indoor space are output from a speaker of AR device 100.

As shown in FIG. 2, sound data generation system 1 includes acquirer 11, indoor information estimator 12, provisional value determiner 13, first correction value calculator 14, second correction value calculator 15, acoustic feature estimator 16, storage 17, and rendering device 20. In the present embodiment, sound data generation system 1 is built in AR device 100 that is worn by a user. Sound data generation system 1 may be implemented by, for example, a computer that may include, for example, a processor and memory that are included in AR device 100. In sound data generation system 1, each functional configuration shown in FIG. 2 is implemented by the processor operating in accordance with a program stored in the memory.

Acquirer 11, indoor information estimator 12, provisional value determiner 13, first correction value calculator 14, second correction value calculator 15, acoustic feature estimator 16, and storage 17 configure acoustic feature estimation system 10. Acoustic feature estimation system 10 is an information processing system for estimating acoustic features of a target indoor space. Acoustic feature estimation system 10 is capable of estimating acoustic features of a target indoor space without using any dedicated equipment for acquiring acoustic features.

Acquirer 11 acquires image data obtained by capturing an image of a target indoor space. For example, acquirer 11 may acquire image data obtained by capturing an image of the entire target indoor space. Acquirer 11 may, for example, acquire an image of each object (indoor object) located in the target indoor space. The indoor object refers to an object that can have some influence on acoustic features, other than structures such as floors, walls, and ceilings. Examples of the indoor object include desks, chairs, beds, curtains, rug, sofa, and windows, but the indoor object is not limited to these examples. In the following description, "located in the indoor space" may also be referred to as "located in the room". The image data is one example of data on the indoor space.

Acquirer 11 may acquire image data from AR device 100, or may acquire image data from an image capturing device located in the indoor space. Acquirer 11 is one example of a second acquirer.

While an example of acquirer 11 that acquires image data has been described, acquirer 11 may acquire, instead of or in addition to the image data, sensing data on the indoor space obtained by a range sensor such as an optical sensor, a radio sensor, or an ultrasonic sensor. For example, the range sensor may be mounted on AR device 100.

Indoor information estimator 12 acquires indoor environment information that includes indoor environments in the target indoor space. The indoor environments refer to information that indicates the intended use of the target indoor space, and examples of the indoor environments include a living room, a hall, a conference room, a corridor, stairs, and a bedroom.

Indoor information estimator 12 may acquire the indoor environment information by, for example, estimating indoor environments in accordance with image data acquired by acquirer 11. For example, indoor information estimator 12 may estimate the indoor environments through image analysis of the image data, or may estimate the indoor environments from outputs that are obtained by inputting image data acquired via acquirer 11 to a machine learning model that has undergone, in advance, training using the image data as input data and the indoor environments as correct information. Alternatively, indoor information estimator 12 may acquire the indoor environments from a user via audio or by operations made to an actuator such as a button. That is, the indoor environments are not limited to being estimated based on the image data. Indoor information estimator 12 functions as a first acquirer that acquires the indoor environment information.

Indoor information estimator 12 also estimates, in accordance with the image data, information for correcting provisional values of the acoustic features that are determined by provisional value determiner 13. Indoor information estimator 12 estimates situations in the indoor space at present in accordance with the image data acquired by acquirer 11. The situations in the indoor space include at least either of a room size and information about indoor objects. In the present embodiment, the situations in the indoor space include both of the room size and the information about indoor objects. Information indicating the situations in the indoor space is one example of the indoor environment information. In the following description, the room size is also referred to as the size of the indoor space.

Provisional value determiner 13 determines provisional values of the acoustic features of the target indoor space in accordance with the indoor environments estimated by indoor information estimator 12. The provisional values of the acoustic features are values of the acoustic features that are initially set in accordance with the indoor environments (e.g., representative values), and refer to not accurate acoustic features of the indoor space, but approximate acoustic features of the indoor space. For example, the provisional values of the acoustic features may be values of average acoustic features appropriate to the intended use of the indoor space. Provisional value determiner 13 uses a reference table that associates indoor environments with the provisional values of acoustic features to determine the provisional values of the acoustic features of the target indoor space.

Here, the reference table will be described with reference to FIG. 3. FIG. 3 shows one example of the reference table that includes the provisional values of acoustic features according to the present embodiment. Note that the reference table shown in FIG. 3 is set in advance and stored in storage 17.

As shown in FIG. 3, the reference table includes, as items, "No.", "Name", "Size (L×W×H)", "Reverberation time", and "Material".

"No." indicates identification information and may be given with numbers in sequence starting from 1. "Name" corresponds to the above-described indoor environments and indicates the intended use of the indoor space. "Size (L×W×H)" indicates the dimensions of the indoor space. The size shown in FIG. 3 is one example of a second size. "Reverberation time" indicates the provisional value of an acoustic feature. "Material" indicates the building construction and material of a building in which the indoor space is located.

Case No. 1 shows that the indoor space is a conference room, the size of the conference room is 4 m deep, 6 m wide, and 2.8 m high, and the provisional value of the reverberation time is 300 ms when the material is a reinforced plaster panel.

Case No. 2 shows that the indoor space is a living room, the size of the living room is 5 m deep, 5 m wide, and 2.4 high, and the provisional value of the reverberation time is 280 ms when the material is a wood plaster panel.

Case No. 3 shows that the indoor space is a hall, the size of the hall is 10 m deep, 12 m wide, and 5 m high, and the provisional value of the reverberation time is 450 ms when the material is reinforced concrete.

"Size" and "Material" indicate conditions (provisional conditions) when the indoor space has characteristics indicated by the provisional values of the acoustic features. The provisional values of the acoustic features may vary if a change is made to at least one of "Size" or "Material".

The reference table may be creased for each of predetermined frequency bands. In this case, provisional value determiner 13 may determine the provisional value of the reverberation time for each of predetermined frequency bands. The predetermined frequency bands are set in advance. For example, the predetermined frequency bands may be octave bands. In the reference tables created for each predetermined frequency bands, name, size, and material are common information.

The reference table may include at least the reverberation time as the provisional value of an acoustic feature. The provisional values of the acoustic features may further include reflectivity or sound absorptivity of each object in the indoor space.

"Material" may include the material of each object located in the indoor space. Examples of the material of each object include leather, cloth, glass, and wood, but the material of each object is not limited to these examples.

Referring back to FIG. 2, first correction value calculator 14 calculates a first correction value for correcting the provisional values of the acoustic features in accordance with the room size (the size of the indoor space). Since the room size mainly has influence on the reverberation time, first correction value calculator 14 may calculate, for example, the first correction value for correcting the reverberation time. In the case where the reference table is created for each predetermined frequency band, first correction value calculator 14 calculates the first correction value for each predetermined frequency band.

Second correction value calculator 15 calculates a second correction value for correcting the provisional of the acoustic features in accordance with the information about objects. Since the information about objects mainly has influence on the reverberation time and the reflectivity, second correction value calculator 15 may calculate, for example, the second correction value for correcting at least one of the reverberation time or the reflectivity. In the case where the reference table is created for each predetermined frequency band, second correction value calculator 15 calculates the second correction value for each predetermined frequency band.

Acoustic feature estimator 16 estimates the acoustic features of the indoor space in accordance with the provisional values of the acoustic features and at least either of the first and second correction values. Acoustic feature estimator 16 performs correction that brings approximate acoustic features of the indoor space (the provisional values of the acoustic features) closer to actual acoustic features of the indoor space, in accordance with at least either of the first and second correction values. In the present embodiment, acoustic feature estimator 16 estimates the acoustic features of the indoor space in accordance with the provisional values of the acoustic features and each of the first and second correction values. Acoustic feature estimator 16 may calculate the acoustic features of the indoor space by performing predetermined computation on the provisional values of the acoustic features and on each of the first and second correction values. For example, the predetermined computation may be four arithmetic operations, but is not limited thereto.

Storage 17 stores the reference table shown in FIG. 3 and data such as various programs. Storage 17 may be implemented by, for example, semiconductor memory, but is not limited thereto.

Rendering device 20 renders sound source data that is originally stored, by using the acoustic features estimated by acoustic feature estimation system 10. When a user has moved in the indoor space, rendering device 20 acquires positional information about the user and renders the sound source data in accordance with the positional information and the acoustic features estimated in advance. This allows sounds output from real or virtual audio equipment (sound source) located in the target indoor space to be reproduced as sounds appropriate to the position and acoustic features of the target indoor space. For example, when the user has moved closer to a sound source or an object having high reflectivity, sounds output from AR device 100 can be modified to sounds appropriate to the fact that the user has moved closer to the sound source or the object. Note that rendering refers to processing for adjusting sound source data in accordance with the indoor environments in the indoor space so that sounds are output from predetermined sound output positions at predetermined sound volumes.

As described above, acoustic feature estimation system 10 according to the present embodiment estimates the acoustic features of a target indoor space without using any dedicated equipment for acquiring acoustic features, by determining the provisional values of the acoustic features in accordance with the indoor environments in the target indoor space and correcting the provisional values of the acoustic features with use of the correction values based on the image data on the target indoor space. Acoustic feature estimation system 10 described above may include, for example, indoor information estimator 12 that acquires (e.g., estimates) indoor environments in the target indoor space, provisional value determiner 13 that determines the provisional values of acoustic features in the indoor space in accordance with the acquired indoor environments, acquirer 11 that acquires image data obtained by capturing an image of the indoor space (one example of data on the indoor space), indoor information estimator 12 that estimates situations in the indoor space in accordance with the image data, and acoustic feature estimator 16 that corrects the provisional values in accordance with the estimated situations and outputs the corrected provisional values as the acoustic features of the indoor space.

[2. Operations of Acoustic Feature Estimation System]

Figure 4:
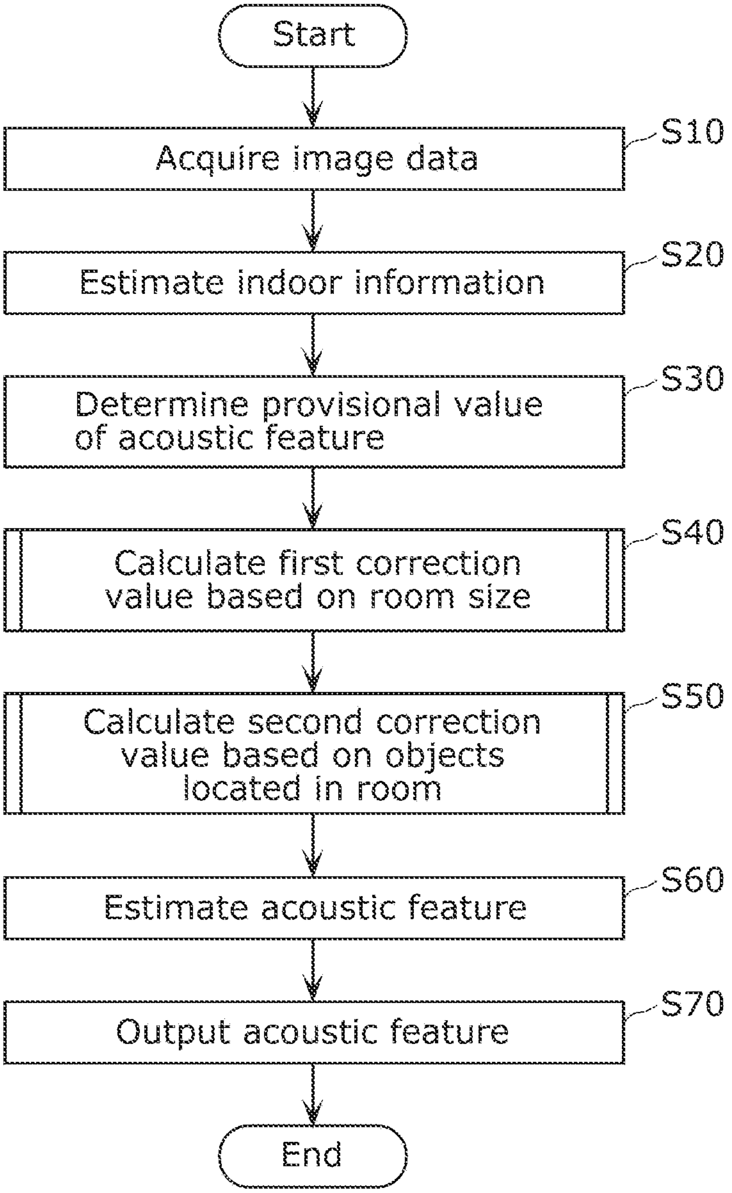
FIG. 4 is a flowchart showing operations of an acoustic feature estimation system according to the embodiment.

Next, operations of acoustic feature estimation system 10 configured as described above will be described with reference to FIGS. 4 to 7. FIG. 4 is a flowchart showing the operations (acoustic feature estimation method) of acoustic feature estimation system 10 according to the present embodiment. The flowchart shown in FIG. 4 may be performed, for example, when a user who wears AR device 100 enters the indoor space for the first time or every time the user enters the indoor space. The operations shown in FIG. 4 are executed before rendering device 20 performs rendering. The following description is given of an example of correcting the reverberation time among the acoustic features.

As shown in FIG. 4, acquirer 11 acquires image data on a target indoor space (S10). The image data may be one data item or a plurality of data items. Acquirer 11 outputs the acquired image data to indoor information estimator 12. Acquirer 11 may also store the acquired image data in storage 17.

Next, indoor information estimator 12 estimates indoor information about the target indoor space in accordance with the image data (S20). Indoor information estimator 12 estimates, as the indoor information, indoor environment information that indicates environments (indoor environments) in the indoor space. It can also be said that indoor information estimator 12 estimates the intended use of the room where the user who wears AR device 100 is located.

Indoor information estimator 12 estimates the intended use of the indoor space such as a living room, a hall, or a conference room in accordance with the image data and outputs the estimated indoor environments to provisional value determiner 13.

Next, provisional value determiner 13 determines the provisional values of acoustic features of the target indoor space in accordance with the indoor environments (S30). Provisional value determiner 13 selects a reverberation time that corresponds to the indoor environments from the reference table shown in FIG. 3 and determines the selected reverberation time as the provisional value of an acoustic feature of the target indoor space. Provisional value determiner 13 outputs the determined provisional value of the acoustic feature to acoustic feature estimator 16. Provisional value determiner 13 may also output the determined provisional value of the acoustic feature to first and second correction value calculators 14 and 15. Provisional value determiner 13 may also store the determined provisional value of the acoustic feature in storage 17. Note that the provisional value of the acoustic feature may be different for each predetermined frequency band, or may be common.

Next, first correction value calculator 14 calculates a first correction value based on the room size (S40). Details on step S40 will be described later. First correction value calculator 14 outputs the calculated first correction value to acoustic feature estimator 16. Note that the first correction value may be different for each predetermined frequency band, or may be common.

Next, second correction value calculator 15 calculates a second correction value based on an object located in the room (S50). Details on step S50 will be described later. Second correction value calculator 15 outputs the calculated second correction value to acoustic feature estimator 16. Note that the second correction value may be different for each predetermined frequency band, or may be common.

Next, acoustic feature estimator 16 estimates acoustic features of the indoor space in accordance with the provisional values of the acoustic features and the first and second correction values (S60). Acoustic feature estimator 16 estimates the acoustic features of the indoor space by correcting the provisional values of the acoustic features in accordance with the first and second correction values. For example, acoustic feature estimator 16 may correct the provisional value of the reverberation time in accordance with the first and second correction values. Correction of the provisional value as used herein refers to addition/subtraction of the correction values to/from the provisional values or multiplication/division of the provisional values by the correction values, but is not limited thereto.

Correcting the provisional value of the reverberation time in accordance with the first correction value is one example of correcting the provisional value of the reverberation time in accordance with the room size. Correcting the provisional value of the reverberation time in accordance with the second correction value is one example of correcting the provisional value of the reverberation time in accordance with the information about objects.

Step S60 is processing for correcting the provisional values in accordance with the estimated situations in the indoor space, and in the present embodiment, it is processing for correcting the provisional values of the acoustic features with use of the first and second correction values. Through the processing in step S60, it is possible to correct average acoustic features appropriate to the indoor environments to acoustic features appropriate to the situations in the indoor space.

In step S60, the acoustic features may be estimated by using, in addition to the corrected reverberation time, the reflectivity of each object in the indoor room, determined with reference to the reflectivity table.

Next, acoustic feature estimator 16 outputs the estimated acoustic features to rendering device 20 (S70). Rendering device 20 renders the sound source data in accordance with the acquired acoustic features received from acoustic feature estimator 16, so as to allow the speaker to output sounds appropriate to the acoustic features of the indoor space. Acoustic feature estimator 16 functions as an output device that outputs the corrected provisional values.

The processing in steps S40 and S50 shown in FIG. 4 may be executed in parallel.

Figure 5:
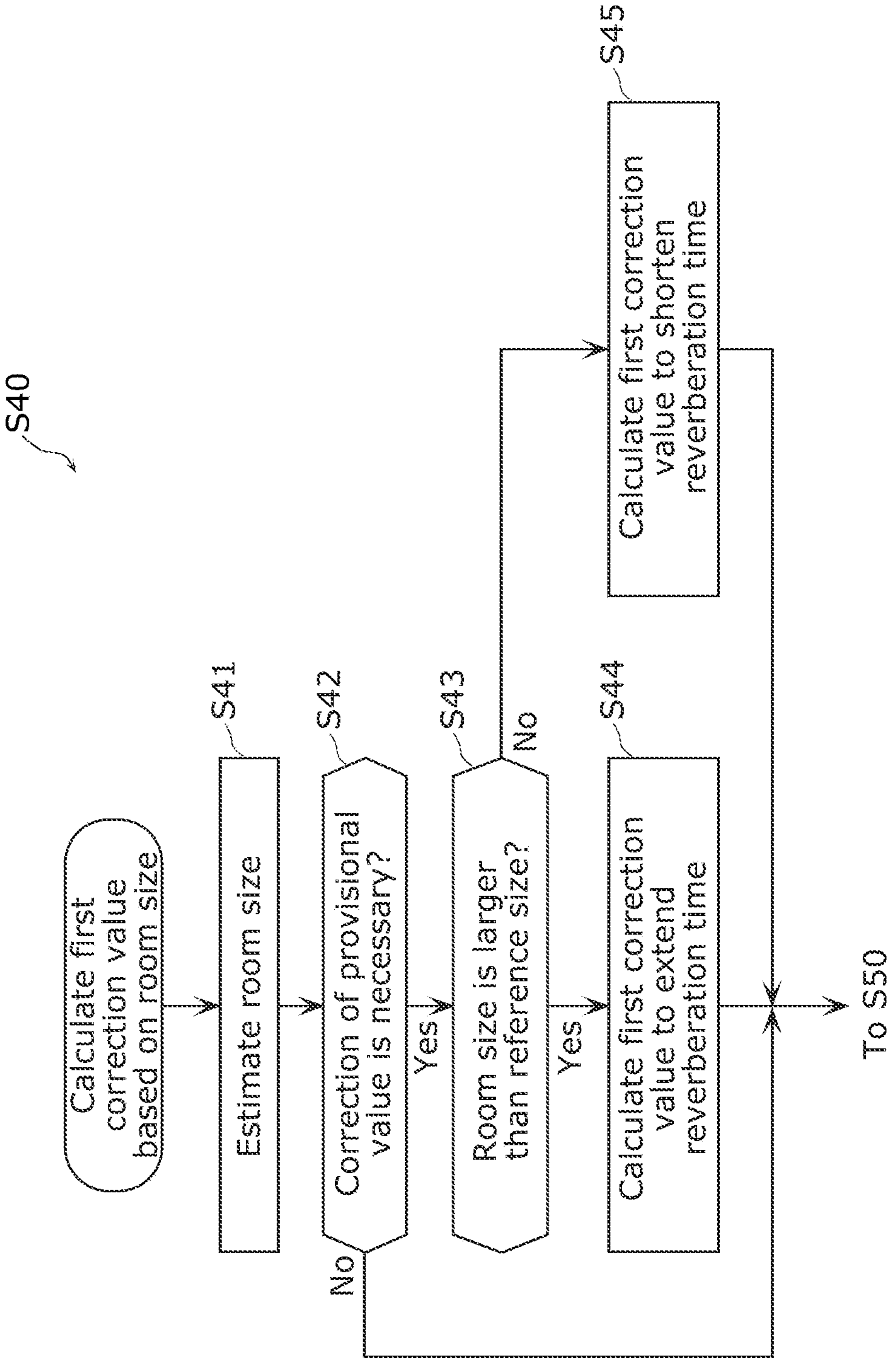
FIG. 5 is a flowchart showing operations performed in step S40 shown in FIG. 4.

Here, the processing in steps S40 and S50 will further be described with reference to FIGS. 5 to 7. FIG. 5 is a flowchart showing operations performed in step S40 shown in FIG. 4 (acoustic feature estimation method).

As shown in FIG. 5, indoor information estimator 12 estimates the room size in accordance with the image data acquired by acquirer 11 (S41). For example, indoor information estimator 12 may estimate the room size through image analysis of the image data. Indoor information estimator 12 outputs the estimated room size to first correction value calculator 14. The room size estimated by indoor information estimator 12 is one example of a first size. Note that the processing in step S41 may be executed in parallel with step S20 shown in FIG. 4.

Next, first correction value calculator 14 determines, in accordance with the estimated room size (first size) and the room size corresponding to the estimated indoor environments (second size), whether it is necessary to correct the provisional values determined by provisional value determiner 13 (S42). When a difference between the first and second sizes falls within a predetermined range, first correction value calculator 14 determines that the correction is unnecessary, whereas when the difference does not fall within the predetermined range, first correction value calculator 14 determines that the correction is necessary. Step S42 is one example of determining whether to correct the provisional value of the reverberation time.

Next, when the correction of the provisional value is determined to be necessary (Yes in S42), first correction value calculator 14 further determines whether the room size is larger than a reference size (S43). The reference size corresponds to the second size, but is not limited thereto.

Next, when the room size is determined to be larger than the reference size (Yes in S43), first correction value calculator 14 calculates a first correction value for extending the reverberation time (S44). That is, first correction value calculator 14 calculates the first correction value for correcting the reverberation time to become longer than the provisional value of the reverberation time. First correction value calculator 14 may calculate the first correction value in accordance with the difference between the room size and the reference size. When the difference between the room size and the reference size is a first difference, the first correction value may be corrected to become larger than in the case where the difference is a second different that is smaller than the first difference. First correction value calculator 14 may calculate the first correction value such that the first correction value becomes larger as the difference between the room size and the reference size increases. For example, in the case where acoustic feature estimator 16 estimates the acoustic features by addition/subtraction, the first correction value becomes a positive value, whereas in the case where acoustic feature estimator 16 estimates the acoustic features by multiplication/division, the first correction value becomes a value larger than one.

When the room size is determined to be smaller than the reference size (No in S43), first correction value calculator 14 calculates a first correction value for correcting the reverberation time to become shorter (S45). That is, first correction value calculator 14 calculates the first correction value for correcting the provisional value of the reverberation time to a shorter reverberation time. First correction value calculator 14 may calculate the first correction value in accordance with the difference between the room size and the reference size. When the difference between the room size and the reference size is the first difference, first correction value calculator 14 may calculate the first correction value such that the absolute value of the first correction value becomes larger than in the case where the difference is the second difference smaller than the first difference. First correction value calculator 14 may calculate the first correction value such that the absolute value of the first correction value becomes larger as the difference between the room size and the reference size increases. For example, in the case where acoustic feature estimator 16 estimates the acoustic features by addition/subtraction, the first correction value becomes a negative value, whereas in the case where acoustic feature estimator 16 estimates the acoustic features by multiplication/division, the first correction value becomes a value smaller than one.

First correction value calculator 14 may calculate the first correction value on the basis of a calculation formula or with reference to a table that indicates a correspondence between the difference and the first correction value. The table or the calculation formula may be set in advance and stored in storage 17.

When the correction of the provisional value is determined to be unnecessary (No in S42) or after execution of the processing in step S44 or S45, the processing proceeds to step S50 shown in FIG. 4.

In this way, when it is determined that the provisional value of the reverberation time is to be corrected in accordance with the first and second sizes, the provisional value of the reverberation time can be corrected in accordance with the acoustic feature based on the first size. The execution of step S44 or S45 allows the correction for making larger the provisional value of the reverberation time to be made when the first size is greater than the second size, and allows the correction for making smaller the provisional value of the reverberation time to be made when the first size is smaller than the second size.

Next, the operations performed in step S50 shown n FIG. 4 will be described with reference to FIGS. 6 and 7. FIG. 6 shows a first example of a flowchart showing the operations in step S50 shown in FIG. 4 (acoustic feature estimation method).

Figure 6:
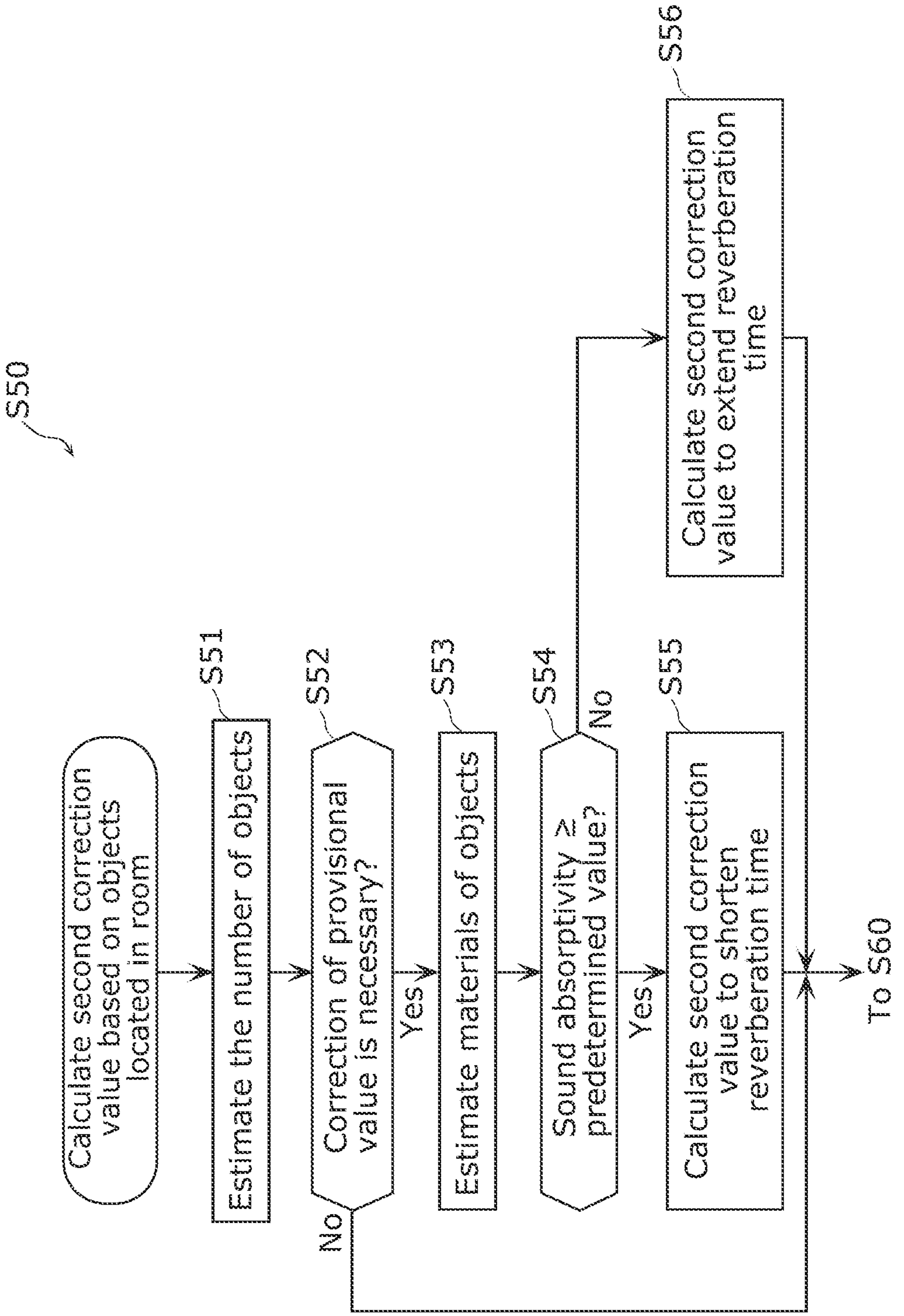
FIG. 6 shows a first example of a flowchart showing operations performed in step S50 shown in FIG. 4.

As shown in FIG. 6, indoor information estimator 12 estimates the number of objects located in the room in accordance with the image data acquired by acquirer 11 (S51). For example, indoor information estimator 12 may estimate the number of objects located in the room through image analysis of the image data. Indoor information estimator 12 outputs the estimated number of objects to second correction value calculator 15. Information indicating the number of objects is one example of the information about objects. Note that the processing in step S51 may be executed in parallel with step S20 shown in FIG. 4 or step S41 shown in FIG. 5. In step S51, the shapes of the objects may be estimated, instead of or in addition to the materials of the objects.

Next, second correction value calculator 15 determines, in accordance with the information indicating the number of objects, whether it is necessary to correct the provisional values determined by provisional value determiner 13 (S52). Second correction value calculator 15 performs the determination in step S52 in accordance with the estimated number of objects (the number of first objects) and the number of objects that is used as a reference (the number of second objects).

When the number of first objects is large, the degree of influence that, out of objects and structures such as floors, walls, and ceilings, the objects have on the acoustic features of the indoor space becomes relatively high. When the number of first objects is small, the degree of influence that, out of the objects and the structures such as floors, walls, and ceilings, the structures have on the acoustic features of the indoor space becomes relatively high. Therefore, in the example shown in FIG. 6, whether to correct the provisional values of the acoustic features is determined in accordance with the number of objects.

When a difference between the number of first objects and the number of second objects falls within a predetermined range, second correction value calculator 15 determines that the correction is unnecessary, whereas when the difference does not fall within the predetermined range, the correction is determined to be necessary. The number of objects to be used as a reference may be the number of objects that corresponds to the estimated indoor environments, or may be the number of objects that is common for the indoor environments. When the number of objects to be used as a reference is the number of objects that corresponds to the estimated indoor environments, the number of objects to be used as a reference may be associated with each name listed in the reference table shown in FIG. 3.

Next, when the correction of the provisional value is determined to be necessary (Yes in S52), second correction value calculator 15 further estimates the materials of the objects located in the room (here, raw materials of the objects) in accordance with the image data (S53). Second correction value calculator 15 may estimate the materials of the objects through image analysis of the image data. Second correction value calculator 15 may estimate the types of the objects through image analysis of the image data and estimate the materials appropriate to the estimated types as the materials of the objects. When an object is configured by a plurality of materials, only the main material may be estimated in step S53. In step S53, the shapes of the objects may also be estimated, instead of or in addition to the materials of the objects.

Next, second correction value calculator 15 determines, in accordance with the materials of the objects, whether the sound absorptivity of each object is higher than or equal to a predetermined value (S54). For example, in the case where objects are curtains, sofa, or beds, the objects are often made of materials such as cloth that is soft, and therefore these objects have high sound absorptivity. For example, such objects have higher sound absorptivity than structures. For example, in the case where objects are windows or the like, the objects are often made of glass that is hard, and therefore these objects have low sound absorptivity. The reverberation time tends to become shorter as the sound absorptivity gets higher, and tends to become longer as the sound absorptivity gets lower. Thus, the determination in step S54 allows the reverberation time to be corrected in accordance with the objects. Note that the predetermined value and the sound absorptivity for each material may be set in advance and stored in storage 17.

In step S54, whether the objects include predetermined materials (e.g., materials having sound absorptivity higher than or equal to a predetermined value) may be determined, instead of the determination of the sound absorptivity.

When there are a plurality of objects, second correction value calculator 15 may compare statistics (e.g., an average value, a median, a mode, a maximum value, or a minimum value) of the sound absorptivity of a plurality of objects with a predetermined value, or may compare the sound absorptivity of each of a plurality of objects individually with a predetermined value.

Next, when the sound absorptivity of the object(s) is determined to be higher than or equal to the predetermined value (Yes in S54), second correction value calculator 15 calculates a second correction value for shortening the reverberation time (S55). That is, second correction value calculator 15 calculates the second correction value for correcting the provisional value of the reverberation time to a shorter reverberation time. In step S55, second correction value calculator 15 may calculate the second correction value in accordance with a difference between the sound absorptivity of the object(s) and the predetermined value.

When the sound absorptivity of the object(s) is determined to be lower than or equal to the predetermined value (No in S54), second correction value calculator 15 calculates a second correction value for extending the reverberation time (S56). That is, second correction value calculator 15 calculates the second correction value for correcting the provisional value of the reverberation time to a longer reverberation time. In step S56, second correction value calculator 15 may calculate the second correction value in accordance with a difference between the sound absorptivity of the object(s) and the predetermined value.

In this way, second correction value calculator 15 corrects the provisional value of the reverberation time in accordance with the estimated material of the object. In the case where the sound absorptivity of the object is higher than or equal to a predetermined value, second correction value calculator 15 may calculate a larger second correction value than in the case where the sound absorptivity of the object is lower than the predetermined value. For example, in the case where acoustic feature estimator 16 estimates the acoustic features by addition/subtraction, the second correction value calculated in step S55 becomes a negative value, whereas in the case where acoustic feature estimator 16 estimates the acoustic features by multiplication/division, the second correction value calculated in step S55 becomes a value larger than one.

Second correction value calculator 15 may calculate the second correction value in accordance with a calculation formula or with reference to a table that indicates a correspondence between the second correction value and the difference between the sound absorptivity of the object and a predetermined value. The table or the calculation formula may be set in advance and stored in storage 17.

When the correction of the provisional value is determined to be unnecessary (No in S52) or after execution of the processing in step S55 or S56, the processing proceeds to step S60 shown in FIG. 4.

Note that the information about objects is not limited to the number of objects. The information about objects may include information about the floor space of the indoor space. An example of calculating the second correction value by using the floor space will be described with reference to FIG. 7. FIG. 7 shows a second example of the flowchart showing the operations performed in step S50 shown in FIG. 4 (acoustic feature estimation method). The following description is given of an example of using the ratio between a reference area and a real area. The ratio between the reference area and the real area is a value for determining whether the number of objects is large or small.

Figure 7:
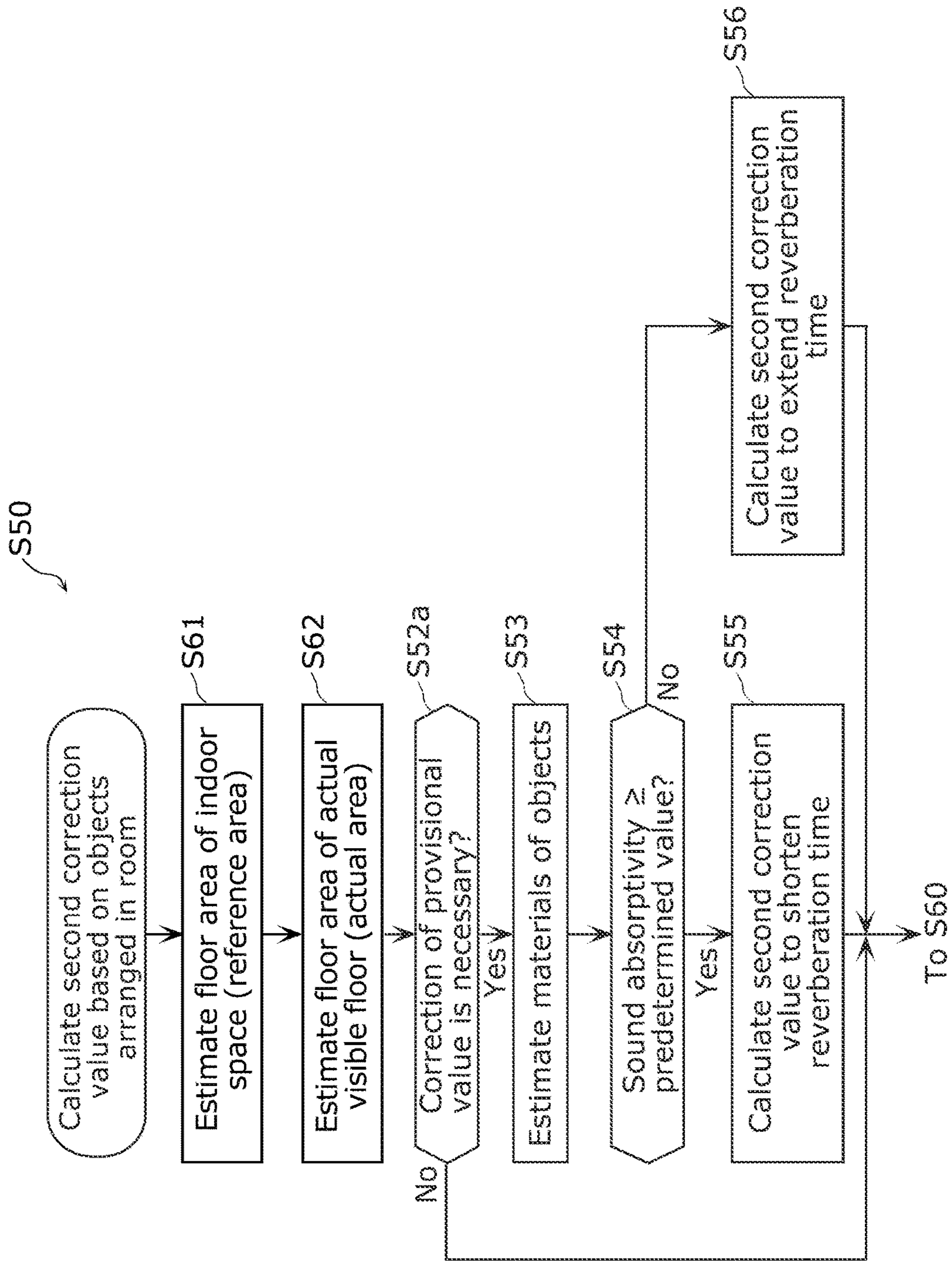
FIG. 7 shows a second example of the flowchart showing the operations performed in step S50 shown in FIG. 4.

As shown in FIG. 7, indoor information estimator 12 estimates the floor area (reference area) of the indoor space and the floor area (real area) of a floor that is actually seen, in accordance with the image data acquired by acquirer 11 (S61, S62). The reference area is the area of the entire floor (the area that does not take any object in consideration), whereas the real area is the area of the floor excluding the portions of the floor that are hidden by objects (area that takes objects in consideration) and is the area of the floor exposed in the real indoor space. Indoor information estimator 12 may estimate the reference area and the real area in accordance with data such as information about space meshes included in the image data.

A smaller real area indicates a larger number of objects located on the floor and indicates situations in which the objects have large influence on the acoustic features of the indoor space. A larger real area indicates a small number of objects located on the floor and indicates situations in which the objects have small influence on the acoustic features of the indoor space.

Next, second correction value calculator 15 determines, in accordance with the reference area and the real area, whether the correction of the provisional values is necessary or unnecessary (S52*a*). Second correction value calculator 15 may determine whether the correction of the provisional values is necessary or unnecessary, in accordance with the ratio between the reference area and the real area (e.g., real area/reference area). Second correction value calculator 15 determines whether the correction of the provisional values is necessary or unnecessary, in accordance with whether the area ratio is greater than or equal to a predetermined value. When the area ratio is less than the predetermined value, second correction value calculator 15 may determine that the correction of the provisional values is necessary. The area ratio is one example of the information indicating the number of objects.

In this way, the provisional values can be corrected when the area ratio is small, e.g., the real area is small, in which case a large number of objects are located in the indoor space and accordingly reflection from the objects has more dominant influence on the acoustic features than the materials of the floor and walls have.

OTHER EMBODIMENTS

While the acoustic feature estimation method and so on according to one or a plurality of modes have been described thus far with reference to the embodiment, the present disclosure is not limited to this embodiment. The present disclosure may also include, without departing from the gist of the present disclosure, other embodiments such as those obtained by making various modifications conceivable by persons skilled in the art to the above-described embodiment, and those obtained by arbitrarily combining any of the constituent elements and the functions in the above-described embodiment within a scope that does not depart from the gist of the present disclosure.

For example, while the above embodiment has described an example of the acoustic feature estimation system mounted on the AR device, the present disclosure is not limited to this example. The acoustic feature estimation system may be mounted on or connected to any other device that is used in a room and that outputs sounds. Examples of the other device include stationary audio equipment and game machines (e.g., portable game machines).

While the above embodiment has described an example of the data on the indoor space that is image data, the data on the indoor space is not limited to the image data, and may be sensing data that allows estimation of, for example, the room size and the number of objects located in the room. For example, the data on the indoor space may be sensing data obtained by a range sensor such as an optical sensor, a radio sensor, or an ultrasonic sensor.

The above-described embodiment may be implemented via a rendering method for acquiring the acoustic features estimated by the acoustic feature estimation method indicated by steps S10 to S70 shown in FIG. 4 and rendering sound source data in accordance with the acquired acoustic features. For example, the rendering device may acquire the acoustic features estimated by the acoustic feature estimation system and render the sound source data in accordance with the acquired acoustic features.

While the above embodiment has described an example of calculating the second correction value in accordance with the sound absorptivity of the objects in steps S55 and S56, the present disclosure is not limited to this example, and the second correction value may be calculated in accordance with the number of objects or the area ratio. For example, the second correction value may be calculated based on the number of objects having sound absorptivity of higher than or equal to a predetermined value. For example, a higher second correction value (the second correction value for shortening the reverberation time) may be calculated as the number of objects having sound absorptivity higher than or equal to the predetermined value increases. Also, a lower second correction value (the second correction value for extending the reverberation time) may be calculated as the number of objects having sound absorptivity lower than the predetermined value increases. For example, the second correction value may be calculated in accordance with the area ratio between the reference area and the area of objects having sound absorptivity higher than or equal to the predetermined value (e.g., area of objects with sound absorptivity higher than or equal to the predetermined value/reference area). A higher second correction value (e.g., the second correction value for shortening the reverberation time) may be calculated with an increase in the area ratio. For example, the second correction value may be calculated with reference to a table that associates the area ratio with the correction value for correcting the reverberation time.

While the room size (L×W×H) is indicated by a numerical value in the above-described embodiment, the room size may be indicated by stepwise terms such as large, medium, and small. While the acoustic features are indicated by numerical values in the above-described embodiment, the acoustic features may be indicated by stepwise terms such as large, medium, and small.

The image data according to the above-described embodiment may be still image data or video data.

The image analysis according to the above-described embodiment may be conducted by any known method.

In the above-described embodiment, each constituent element may be configured by dedicated hardware, or may be implemented by executing a software program suitable for each constituent element. Each constituent element may also be implemented by a program executor such as a CPU or a processor reading out and executing a software program recorded on a hard disk or a recording medium such as semiconductor memory.

Sequences of execution of the steps in the flowcharts are merely examples in order to specifically describe the present disclosure, and may be sequences other than those described above. Some of the above-described steps may be executed simultaneously (in parallel) with other steps, or may not be executed.

The way of dividing the functional blocks in each block diagram is merely one example, and a plurality of functional blocks may be implemented via a single functional block, or one functional block may be divided into a plurality of functional blocks, or some functions may be transferred to other functional blocks. The functions of a plurality of functional blocks that have similar functions may be processed in parallel or in time sequence by single hardware or software.

The acoustic feature estimation system according to the above-described embodiment may be implemented via a single apparatus, or may be implemented via a plurality of apparatuses. In the case where the acoustic feature estimation system is implemented by a plurality of apparatuses, each constituent element of the acoustic feature system may be divided in any way into the plurality of apparatuses. In the case where the acoustic feature estimation system is implemented by a plurality of apparatuses, there are no particular limitations on the communication method used between the apparatuses, and the communication method may be wireless communication or cable communication. A combination of wireless communication and cable communication may be used between the apparatuses.

Each constituent element described in the above-described embodiment may be implemented via software, or may be implemented typically via LSI serving as an integrated circuit. These constituent elements may be formed individually into a single chip, or some or all of the constituent elements may be included and formed into a single chip. While LSI is described here as an example, it may also be referred to as IC, system LSI, super LSI, or ultra LSI depending on the degree of integration. The method of circuit integration is not limited to LSI, and may be implemented via a dedicated circuit (general-purpose circuit for executing a dedicated program) or a general-purpose processor. A field programmable gate array (FPGA) capable of programming or a reconfigurable processor capable of reconfiguring connections or settings of circuit cells inside LSI may be used after manufacture of LSI. Moreover, if any other circuit integration technology that replaces LSI makes its debut with the advance of semiconductor technology or with derivation from other technology, such technology may of course be used to integrate constituent elements into an integrated circuit.

System LSI is super-multi-functional LSI manufactured by integrating a plurality of processors on a single chip, and is specifically a computer system configured to include, for example, a microprocessor, read only memory (ROM), and random access memory (RAM). The ROM stores computer programs. The system LSI achieves its functions as a result of the microprocessor operating in accordance with computer programs.

One aspect of the present disclosure may be a computer program that causes a computer to execute each characteristic step included in the acoustic feature estimation method shown in any of FIGS. 4 to 7. Another aspect of the present disclosure may be a computer program for causing a computer to execute each characteristic step included in the rendering method described above.

For example, the programs may be programs to be executed by a computer. Another aspect of the present disclosure may be a non-transitory computer-readable recording medium that records such programs thereon. For example, such programs may be recorded on a recording medium and may be circulated or distributed. For example, distributed programs may be installed in another apparatus that includes a processor, and may be executed by the processor so as to allow the apparatus to execute each processing described above.

INDUSTRIAL APPLICABILITY

The present disclosure may be applicable in devices and so on that are used indoor and that are capable of outputting sounds.

The invention claimed is:

1. An acoustic feature estimation method for estimating an acoustic feature of a space, the acoustic feature estimation method comprising:
- acquiring data on the space;
- estimating a situation in the space in accordance with the data acquired;
- calculating, in accordance with the data acquired, a correction value for correcting reverberation and reflectivity in the space;
- correcting a provisional value of the acoustic feature in accordance with (i) the correction value for correcting reverberation and reflectivity and (ii) the situation estimated; and
- outputting the provisional value corrected.

2. The acoustic feature estimation method according to claim 1,
- the provisional value is determined based on environment information that indicates an environment in the space.

3. The acoustic feature estimation method according to claim 1,
- wherein the data is image data obtained by capturing an image of the space.

4. The acoustic feature estimation method according to claim 1,
- wherein the data is sensing data obtained by sensing the space.

5. The acoustic feature estimation method according to claim 1,
- wherein at least one of a first size of the space or information about an object located in the space is estimated as the situation in accordance with the data, and
- in the correcting of the provisional value, the provisional value is corrected in accordance with the at least one estimated.

6. The acoustic feature estimation method according to claim 5,
- wherein the acoustic feature includes a reverberation time in the space, and
- in the correcting of the provisional value, the provisional value of the reverberation time is corrected in accordance with the first size.

7. The acoustic feature estimation method according to claim 6,
- wherein whether or not to correct the provisional value of the reverberation time is determined in accordance with the first size and a second size of a reference space that corresponds to the environment in the space, and
- in the correcting of the provisional value, the provisional value of the reverberation time is corrected when it is determined that the provisional value of the reverberation time is to be corrected.

8. The acoustic feature estimation method according to claim 7,
- wherein, when the first size is larger than the second size, the provisional value of the reverberation time is corrected to extend the reverberation time, and when the first size is smaller than the second size, the provisional value of the reverberation time is corrected to shorten the reverberation time.

9. The acoustic feature estimation method according to claim 5,
- wherein the acoustic feature includes a reverberation time in the space, and
- in the correcting of the provisional value, the provisional value of the reverberation time is corrected in accordance with the information about the object.

10. The acoustic feature estimation method according to claim 9,
- wherein, when it is determined that the provisional value of the reverberation time is to be corrected, at least one of a material or a shape of the object located in the space is estimated in accordance with the data, and
- in the correcting of the provisional value, the provisional value of the reverberation time is corrected in accordance with the at least one of the material or the shape of the object estimated.

11. The acoustic feature estimation method according to claim 2,
- wherein, in the acquiring of the environment information, the environment information is acquired by estimating the environment information in accordance with the data.

12. The acoustic feature estimation method according to claim 2,
- wherein the acoustic feature of the space is used for rendering of a sound signal in an augmented reality (AR) device, and
- the data and the environment information are acquired from the AR device.

13. The acoustic feature estimation method according to claim 2,
- wherein the environment includes information indicating an intended use of the space.

14. An acoustic feature estimation system for estimating an acoustic feature of a space, the acoustic feature estimation system comprising:
- an acquirer that acquires data on the space;
- an information estimator that estimates a situation in the space in accordance with the data acquired;
- a correction value calculator that calculates, in accordance with the data acquired, a correction value for correcting reverberation and reflectivity in the space;
- an acoustic feature estimator that corrects a provisional value of the acoustic feature in accordance with (i) the correction value for correcting reverberation and reflectivity and (ii) the situation estimated; and
- an output device that outputs the provisional value corrected.

15. A non-transitory computer-readable recording medium having recorded thereon a program for causing a computer to execute the acoustic feature estimation method according to claim 1.

16. A rendering method for rendering sound source data by using an acoustic feature,
- the acoustic feature being a value obtained by:
- acquiring data on the space;
- estimating a situation in the space in accordance with the data acquired;

calculating, in accordance with the data acquired, a correction value for correcting reverberation and reflectivity in the space; and correcting a provisional value of the acoustic feature in accordance with (i) the correction value for correcting reverberation and reflectivity and (ii) the situation estimated.

17. The acoustic feature estimation method according to claim 1, wherein, in the estimating of the situation in the space, a first size of the space and information about an object located in the space are estimated in accordance with the data, the acoustic feature estimation method further comprises:

determining whether or not to correct the provisional value of the acoustic feature in accordance with the first size of the space, and calculating a first correction value in accordance with the first size when it is determined that the provisional value of the acoustic feature is to be corrected; and determining whether or not to correct the provisional value of the acoustic feature in accordance with the information about the object, and calculating a second correction value in accordance with the information about the object when it is determined that the provisional value of the acoustic feature is to be corrected, wherein the correction value includes the first correction value and the second correction value.

18. The acoustic feature estimation method according to claim 9, wherein the information about the object includes a total number of objects or an area of a floor exposed in the space, and a material of the object, the objects each being the object.

19. The acoustic feature estimation method according to claim 18, wherein the acoustic feature includes a reverberation time in the space, the acoustic feature estimation method further comprises:

determining whether or not to correct provisional value of the reverberation time in accordance with the total number of the objects or the area of the floor exposed in the space, wherein, when it is determined that the provisional value of the reverberation time is to be corrected in the determining, the provisional value of the reverberation time is corrected in accordance with the material of the object.

20. The acoustic feature estimation method according to claim 7, wherein the provisional value of the acoustic feature corresponding to the data acquired and the second size are determined in accordance with: a reference table in which the situation in the space, the size of the space, and the provisional value of the acoustic feature are associated; and the situation estimated.

* * * * *